United States Patent
Rogers et al.

(10) Patent No.: US 11,488,622 B2
(45) Date of Patent: Nov. 1, 2022

(54) EMBEDDED AUDIO SENSOR SYSTEM AND METHODS

(71) Applicant: CELLULAR SOUTH, INC., Ridgeland, MS (US)

(72) Inventors: Brett Rogers, Brandon, MS (US); Tommy Naugle, Terry, MS (US); Stephen Bye, Atlanta, GA (US); Craig Sparks, Madison, MS (US); Arman Kirakosyan, Brandon, MS (US)

(73) Assignee: CELLULAR SOUTH, INC., Ridgeland, MS (US)

(*) Notice: Subject to any disclaimer, the term of this patent is extended or adjusted under 35 U.S.C. 154(b) by 329 days.

(21) Appl. No.: 16/716,359

(22) Filed: Dec. 16, 2019

(65) Prior Publication Data

US 2021/0183406 A1 Jun. 17, 2021

(51) Int. Cl.
| | |
|---|---|
| *G10L 19/00* | (2013.01) |
| *G10L 25/78* | (2013.01) |
| *G16Y 40/10* | (2020.01) |
| *G06N 5/04* | (2006.01) |
| *G06N 7/00* | (2006.01) |
| *G16Y 20/10* | (2020.01) |

(52) U.S. Cl.
CPC .............. *G10L 25/78* (2013.01); *G06N 5/04* (2013.01); *G06N 7/005* (2013.01); *G16Y 20/10* (2020.01); *G16Y 40/10* (2020.01)

(58) Field of Classification Search
CPC ........ G10L 25/78; G16Y 20/10; G16Y 40/10; G06N 5/04; G06N 7/005; G06F 15/18; G06F 3/165; G08B 21/00; H04M 3/002; H04N 7/18; B60H 1/00785

USPC .......................................................... 704/200
See application file for complete search history.

(56) References Cited

U.S. PATENT DOCUMENTS

| | | | |
|---|---|---|---|
| 2006/0203879 A1* | 9/2006 | Ruttiger ............. | B60H 1/00785 374/185 |
| 2008/0240458 A1 | 10/2008 | Goldstein et al. | |
| 2009/0002157 A1* | 1/2009 | Donovan ................. | H04N 7/18 340/540 |

(Continued)

OTHER PUBLICATIONS

Pires et al. (NPL retrieved from the Internet URL https://www.mdpi.com/2079-9292/8/12/1499/htm), Recognition of activities of daily living and environments using acoustic sensors embedded on mobile devices, Dec. 7, 2019, Electronics 2019, vol. 8 pp. 1499 (Year: 2019).*

*Primary Examiner* — Md S Elahee
(74) *Attorney, Agent, or Firm* — Steptoe & Johnson LLP; Scott M. Richey

(57) ABSTRACT

An embedded sensor can include an audio detector, a digital signal processor, a library, and a rules engine. The digital signal processor can be configured to receive signals from the audio detector and to identify the environment in which the embedded sensor is located. The library can store statistical models associated with specific environments, and the digital signal processor can be configured identify specific events based on detected sounds within the particular environment by utilizing the statistical model associated with the particular environment. The DSP can associate a probability of accuracy for the identified audible event. A rules engine can be configured to receive the probability and transmit a report of the detected audible event.

6 Claims, 11 Drawing Sheets

(56) References Cited

U.S. PATENT DOCUMENTS

| | | |
|---|---|---|
| 2009/0089800 A1 | 4/2009 | Jones et al. |
| 2012/0185418 A1* | 7/2012 | Capman .................. G06F 3/165 706/12 |
| 2015/0254570 A1 | 9/2015 | Florence et al. |
| 2016/0020744 A1 | 1/2016 | Kok et al. |

* cited by examiner

Daily report for {Mom and or Dad}

Health Stats:
-Weight (Compared to last week, and last month)
-BP
-Pulse Oxygen
-Glucose Level

Physical Activity:
-Steps
-Standing
-Locations visited

Hygiene:
-Shower
-Brush Teeth

Entertainment:
-Minutes of content streamed
-Minutes on Applications (news, weather, sports, radio, games)

Meals:
-Estimate on how many

Sleep Schedule (Duration)
-Normal evening, or disturbed sleep?
-How many hours?

Video Clips from the day
-Door camera (if Applicable)

Figure 10

EMBEDDED AUDIO SENSOR SYSTEM AND METHODS

TECHNICAL FIELD

The present invention relates to systems and methods for audio sensors, and in particular to remote sensors for detecting sounds and digital signal processing at the edge of detection.

BACKGROUND

In the field of audio sensors and monitoring, there is public concern over the recording of private information. And for embedded sensors, the amount of memory and processing power required to adequately monitor and identify sounds of interests from the cacophony of everyday noise can become a hurdle.

SUMMARY

The present invention is generally directed to systems and methods for monitoring environments. A system executing the methods can be directed by a program stored on non-transitory computer-readable media.

An aspect of an embedded sensor can include an audio detector, a digital signal processor (DSP), a library, and a rules engine. The DSP can be configured to receive signals from the audio detector and/or to identify an environment in which the embedded sensor is located. The library can store statistical models associated with one or more environments, and the DSP can be configured to determine and associate probabilities with detected audible events, for example, based on statistical models. The rules engine can be configured to receive probabilities associated with detected audible events and/or to transmit reports of audible events.

Some embodiments can include one or more additional detectors. The additional detectors can be configured to send detector signals to the DSP. The DSP can be configured determine probabilities that a detected event is in fact the identified event. The DSP can utilize information from the additional sensors to improve the accuracy of identifying events and can update the probabilities of such accuracy. The additional detectors can include cameras, thermometers, humidity detectors, weight scales, vibration sensors, and/or additional audio detectors, as well as other types of detectors.

In other embodiments, embedded sensors can include one or more additional detectors that can be configured to send data to a rules engine. The rules engine can be configured to infer an event based on probabilities calculated by the DSP and/or based on data from the one or more additional detectors.

Another aspect of an embedded sensor can include an audio detector, two DSPs, a controller, a library, and a rules engine. The audio detector can detect sounds associated with audible events. The first DSP can receive signals from the audio detector and can be configured to compare the signals to a set of environmentally-distinctive sounds. The first DSP can be configured to transmit environment codes associated with specific environments. The selection of an environment code can be based on the comparison of the signals to a set of environmentally-distinctive sounds. The controller can be configured to receive environment codes and/or to identify a statistical model associated with environment codes. The library can be configured to store statistical models associated with various environments. The second DSP can be configured to receive signals from the audio detector. The second DSP can be configured to compare signals to statistical models and/or to determine probabilities based on the comparison of signals to statistical models. The probabilities can reflect a level of accuracy that a particular sound and/or signal is associated with a particular event. The rules engine can be configured to transmit a report of the audible event. The rules engine can determine whether to send such a transmission based on probabilities determined by the second DSP.

In some embodiments, the library can take the form of RAM. In other embodiments, the library can include RAM, disk memory, and/or ROM.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 10 illustrates an exemplary report generated by an embodiment.

DETAILED DESCRIPTION

Figure 1:
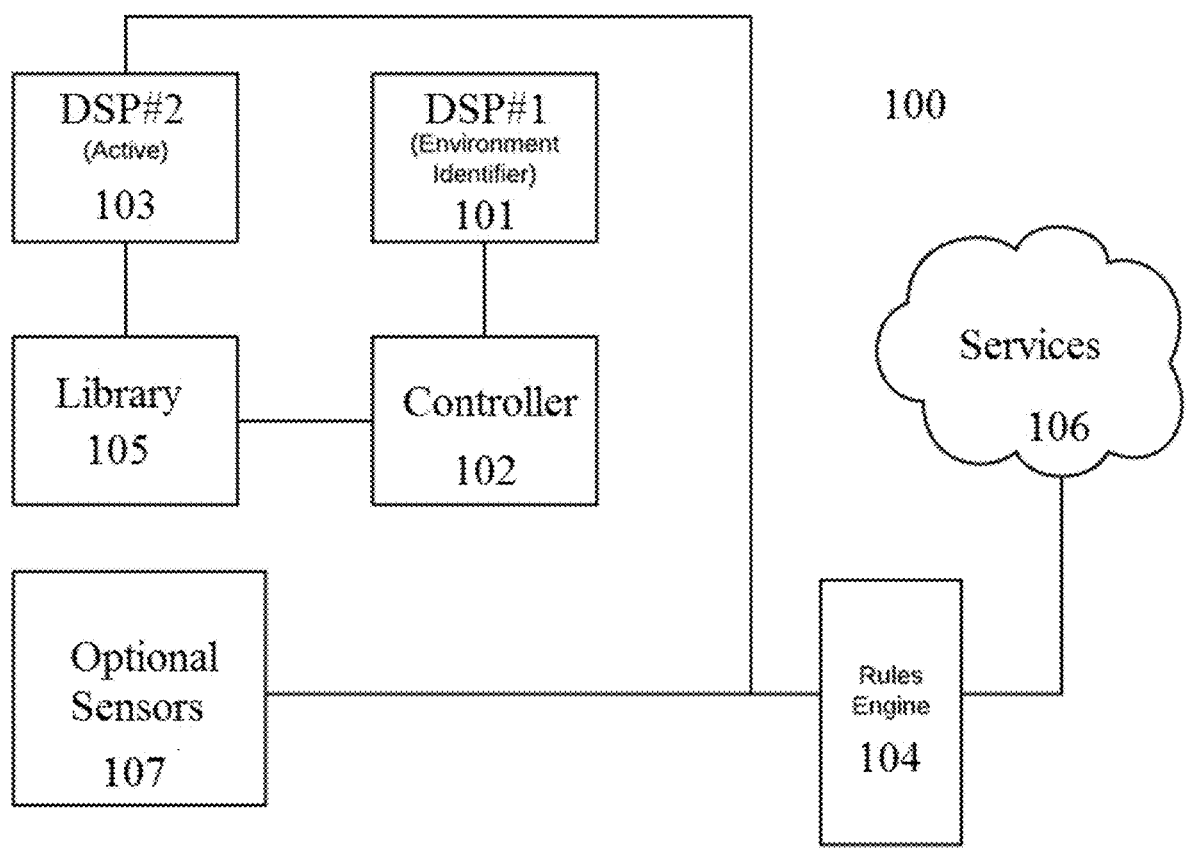
FIG. 1 illustrates a system for continuous monitoring of an environment

A detailed explanation of the system, method, and exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

Present embodiments include systems and methods for audio sensors. Aspects can include remote sensors for detecting sounds and digitally processing detected sounds at the edge of detection. The systems and methods can be utilized to increase accuracy in environmental classification, to improve privacy, and to reduce memory and processing requirements of the remote sensors.

Everyday environments are filled with endless arrays of sounds, such as copiers whirring, phones ringing, televisions, running water, microwave ovens, door bells, footsteps, cooking, washing machines, talking, coughing, and sneezing. Even at night, there are many detectable sounds, such as HVAC, barking dogs, cars driving by, and snoring.

Such sounds present a mix of noise and sounds of interest. Indeed, even in an environment that would seem silent to a person nevertheless includes detectable sound signatures, a phenomenon known as room tone. The mix of sounds can be detected by audio sensors and analyzed to determine various activities occurring in the environment. For example, when deployed in a home, a microwave sound, plus glass of water being filled, and then the sound of dishes being cleaned could be interpreted as a certain number of occupants having a meal. That interpretation can be accorded confidence if the particular environment where the sounds were detected was also determined to be a kitchen. Similarly, various loud noises or a cry for help can indicate an emergency, or the sound of a window being broken, especially late at night, can indicate an intrusion. Present embodiments contemplate an intelligent statistical classifier that can be utilized make such determinations. The classifier can include a rules engine that can be used to identify specific activities in a given environment. A statistical classifier can infer the occurrence of particular events that correlate with a desired monitored activity. A record of activity can be used to help bring awareness to people that are monitoring or concerned about activity in the environment (for example, businesses, homes, elder care facilities and homes, infants' rooms, vehicles, etc.).

Some audio-based products exist, such as Google Home and Amazon Echo. But known products suffer from several technological problems. For example, many rely on key words or trigger words. When the trigger word is announced and recognized, audio is then delivered to a cloud system for analysis and a response to the end user. While those systems are always listening, they are only listening to a relatively few keywords, such as "Alexa," "Google,", "Siri," and any triggers corresponding to specific skills that have been installed on the product. Another problem with such technology is that it relies on large libraries of sounds. Yet another problem fundamental to the architecture of such systems, as exhibited in a few famous examples, is that they can indiscriminately upload detected sounds, such as private conversations, to a cloud. That raises a host of privacy concerns.

Present embodiments can include embedded sensors utilizing environmental classifiers that can identify specific types of environments. An environmental classifier can be utilized to select an appropriate statistical classifier to be implemented by an audio sensor system. A statistical classifier can be optimized and/or specialized for a particular type of environment. An embedded sensor can process audible events on the edge of detection by applying the appropriate statistical classifier based on the environment the sensor is in. The analysis can happen on the edge rather than in a cloud, solving privacy and cost issues of cloud based analysis. Embodiments can also include edge computing methods for invoking an ensured privacy wall whilst allowing time-sensitive event detection above a statistically useful threshold.

While present embodiments can be programmed to respond to trigger words, they contemplate several solutions over reliance on trigger words. For example, a statistical classifier can be utilized to listen in real-time for a broad range of events, not just a handful of trigger words. Audio and other sensor data can be processed at an embedded sensor, without any uploading of information to a cloud for remote processing. Processing at the embedded sensor can also significantly reduce the various drawbacks associated with continuous streaming. The sensors can operate within a given environment, processing on the edge rather than in the cloud, and can apply the correct statistical classifier for that environment on the edge.

An audio digital signal processor environment identifier can be preloaded with a statistical classifier which can be engineered to associate streaming data with the environment in which an embedded sensor is located. The sensor can be capable of detecting local events, using only hardware that is on the sensor, and then report the occurrence of events to a service. Event detection can become easier with knowledge of the environment type in which the sensor is located. This knowledge can be achieved through a separate task of environment identification. For example, an onboard audio digital signal processor can process audio captured by an onboard microphone. The procedure of identifying the environment type can begin on initial boot of the sensor.

One or more audio digital signal processors can take analog audio signals from a microphone, convert the signals to a vector, and optionally implement additional linear algebra operations on the vector to measure, filter, and/or compress the original audio signal. A digital signal processor (DSP) can be implemented in software executed by a central processing unit (CPU). In preferred embodiments, DSPs are implemented by distinct processors and/or circuit logic, which can be faster and require less power than implementing DSPs strictly through a CPU. DSPs can be configured within embodiments to optimally utilize memory and computing architecture to perform linear algebra operations in real-time. Such operations can also be utilized to infer events that are occurring in the environment. Therefore, rather than leveraging a separate CPU for further processing of the audio data, the sensor can leverage the DSP's processing specialty for performing event detection. Such architecture can also be advantageous from a manufacturing cost perspective because a component for capturing audio is simultaneously used for additional computing tasks, preventing the need for additional computing hardware, such as an expensive dedicated high-performance CPU.

The sensor can identify events based on audio captured in a certain environment, and different environments can require different methods of identification and different events of interest. For example, events like a toilet flush or shower running would be expected to occur in a bathroom and not in a kitchen. Different methodology may be used for events which occur in a bathroom as opposed to events which occur in a kitchen. Embodiments can address two classification tasks: one classification which determines the environment in which the sensor is located; and one classification which identifies any events of interests which are occurring in real-time. In a preferred embodiment, the sensor can solve both tasks. To address the first task, the environment identifier DSP can have a statistical classifier loaded which has been configured to take streaming audio data (in vector form) as an input, and then output a vector of probabilities corresponding to the likelihood of the sensor being present in a certain environment, from a collection of predetermined possible environments. Each entry in this probability vector can be a likelihood for which a certain environment of interest is in fact the environment in which the sensor currently resides. This classifier is called the environment statistical classifier. An important advantage to the environment statistical classifier is the reduced memory space for libraries of known audio features and reduced processing requirements because the library of known features can be environment-specific and therefore smaller.

One high-level design strategy for the environment statistical classifier can be to detect an event from a set of events, where each event in that set is unique to a particular environment. For example, when discerning between a kitchen environment and a bathroom environment, the system can try to detect the event of a toilet flush (unique to a bathroom) or the event of a microwave (unique to a kitchen). The occurrence of one of these events can then register as a successful identification of the environment in which the sensor is located (bathroom or kitchen).

Referring to FIG. 1, a system (100) for continuous (e.g. 24/7) monitoring can include a first audio digital signal processor (DSP). The first audio DSP (101) can include an environment identifier, which can be preloaded with a statistical classifier that has been engineered to associate streaming data with the environment in which the sensor is located. When the classifier successfully identifies an event associated with a particular environment, it can inform the controller. The controller can be a low-power computer chip which is capable of performing basic operations such as basic arithmetic, number comparisons, and logic, the result of which influences actions taken across the various components of an integrated circuit. The controller can assign the correct statistical classifier to an active audio DSP (103). The active audio DSP can perform the task of detecting the events happening in a given environment, with the ultimate goal of these events being reported to a service. This DSP can be loaded with a statistical classifier (from the statistical classifier library) corresponding to a certain environment. As the active audio DSP (103) feeds audio data as input to the statistical classifier, it can send corresponding output probabilities to a rules engine (104). A rules engine can have a separate model for reviewing output of the audio DSPs and/or the other sensors. A separate model can include rules deduced by statistical analysis, for example, to improve recognition accuracy. For example, smoothing out of noise from a detected signal can be performed. The detection frequency of an event or set of events can be indicative of a high likelihood of false positives (e.g. oscillating between low-confidence detections of toilet and microwave 100 times per second). When the rules engine makes a determination, results can be sent to the service (106) for actions. Services can be remote, such as via closed circuit or over a network, such as a cloud-based system. Actions can include updating a client device, such as a mobile app, a dashboard, a 911 dialing system, etc. Additionally, no audio, video, or personally identifiable information need ever be sent from the system to the service. Rather, notice of identified events can be reported. A rules engine can also receive data from other sensors (107) to help increase the accuracy of inferred events. Such optional sensors can include FLIR sensors, thermometers, barometers, humidity detectors, smoke detectors, light sensors. A library (105) can include a library of statistical models, such as a set of all statistical classifiers deployed on the integrated circuit, stored in ROM. Some of the statistical classifiers can have the task of identifying the environment in which the sensor is placed, and some can have the task of detecting events from a set of events which may happen within a certain environment. The library and controller (102) can be updated remotely, such as by a cloud-based management system. The controller can comprise circuit logic, a processor, and/or a host processor. Logic can be applied to the controller so that the system need not continuously toggle between models to the active audio DSPs.

Audio events can be detected by an audio detector or sensor within the embedded sensor device. The audio detector can be a microphone, such as a dynamic microphone, a condenser microphone, a ribbon microphone, a carbon microphone, or other type of acoustic sensor, such as a piezoelectric transducer and a microelectromechanical system (MEMS). Generally, any acoustic sensor that can suitably detect sound and that convert can the detected sound into electrical signals can be utilized.

Detected audio events can be correlated with certain features, i.e. a vector representation of an audio signal which has been processed in a way such that it can be served as input to a statistical classifier. A statistical classifier can be optimized to take a feature representation of data and output a vector of probabilities corresponding to the function's inferred label of the data, up to a targeted level of accuracy with the data's correct label. Accordingly, embodiments can assign probabilities determinations made based on detected audio events. Such a confidence score can be proportional to the likelihood that an inferred label is the correct label for the detected event. Embodiments can also make real-time inferences. In other words, features can be streamed into a statistical classifier as input, and then from the output, rules can be applied to infer the streaming data's correct label. Several different types of statistical classifiers can be utilized, such as naïve Bayes, decision tree, random forest, logistic regression, multinomial logistic regression, support vector machine, neural network. In an example, a statistical classifier library can include a set of deployed statistical classifiers. The deployed classifiers can be stored in ROM. An environment identifier statistical classifier can include a statistical classifier which is trained to identify the type of environment in which the device is placed using environment audio features as an input. An active statistical classifier can be trained to identify events within the environment in which the device is located. The active classifier can use environmental audio features as inputs. The active classifier can be loaded into RAM after the environment identifier statistical classifier determines the environment in which the device is located.

A plurality of statistical classifiers can be simultaneously implemented. In some embodiments, an ensemble of statistical classifiers can be implemented and their results can be averaged. A similarity among these types of classifiers is that the process of configuring them can include analysis of a cost function, which when minimized corresponds with a classifier that is most accurate. The cost function is an average of loss function, which computes the error for a single training example, in particular a function which punishes statistical classifiers for incorrect labeling and rewards statistical classifiers for correct labeling on an example-by-example basis. This can be accomplished by taking as input an example from a labeled dataset, a classifier's inferred label for the example, and/or an example's true label. The function then can output a number which can be large, if the inferred label is incorrect, or small, if the inferred label is the true label. The cost function can also do this at the level of a set of many examples. Typically this can be done by averaging values returned by the loss function over all examples in a dataset. Small values returned by the cost function correspond with more accurate statistical classifiers.

Below is an example cost function which is used in logistic regression. Inaccuracy can be used as a loss function, taking the average over all examples and minimizing it. However, certain transformations in logistic regression prevent the optimization methods from any guarantees on minimizing the cost function. A better method is to implement a cost function based on the natural logarithm, as shown below, each $x^i$ is the input data and $y^i$ is its corresponding label (possibly either 0 or 1).

$$J(\theta) = \frac{1}{m}\sum_{i=1}^{m} [-y^{(i)}\log(h_\theta(x^{(i)})) - (1 - y^{(i)})\log(1 - h_\theta(x^{(i)}))]$$

Systems and methods can include optimization methods algorithms, which given the cost function for a set of examples and a statistical classifier, iteratively attempts to minimize the cost function's value by changing the statistical classifier's parameters.

The cost function can be a key measurement for assessing a classifier's accuracy, and optimization methods can attain a value that corresponds with good statistical classifier accuracy. A statistical classifier can use gradient descent algorithm for minimizing the cost function. Gradient descent makes use of the gradient which will point in the direction of a function's maximum (or minimum). An exemplary gradient descent is shown below, where $x_n$ is the current vector of parameters that completely determine the classifier's behavior, $\gamma_n$ is some small fixed number, $\nabla F$ is the gradient of the cost function F, and $x_{n+1}$ is the new set of parameters for the classifier after adjusting by $-\gamma_n \nabla F$.

$$x_{n+1} = x_n - \gamma_n \nabla F(x_n)$$

A new set of parameters ($x_{n+1}$) for the statistical classifier can be generated by moving in the direction of $-\nabla F$, i.e. the direction that makes the cost function smaller.

Referring again to FIG. 1, when the environment identifier successfully identifies an event associated with a particular environment, it can inform the controller, which solves the first task identified above. Embodiments can solve the second identified task, namely, identifying events of interests which are occurring in real-time. Positive identification of a classification can be based on, for example, a probability greater than or equal to 0.5 which is associated with an inferred label. Additional logic can be implemented on top of this. When the methodology yields a positive identification, a message can be sent to inform the controller of the event. The controller can manage next steps taken to begin performing event classification within the particular environment.

With proper identification of the environment in which the sensor is located, the second classification task (event detection) in FIG. 1 can be performed on the second onboard audio DSP, i.e. the active audio DSP (103). Based on the environment identified by the statistical classifier, the controller can send instructions to ROM to load the corresponding statistical classifier from the statistical classifier library onto the active audio DSP, which can detect events within the identified environment. With an appropriate event statistical classifier loaded to the audio DSP, the audio DSP can send audio data as input to the event statistical classifier. The event statistical classifier can output a vector of probabilities, where each probability corresponds to an inferred label which represents the occurrence of an event within the current environment. The vector of probabilities can be sent to the rules engine for the next step in processing the inference results.

Detecting an event based on audio alone can suffer from ambiguity, for example where events of interest for a particular environment sound similar. For example, a sensor operating in a bathroom may easily detect the event of a shower running using audio alone. But a running bathroom faucet presents the risk of a false positive of a shower. Embodiments can address that issue and improve accuracy by various means as described here, such as larger vector libraries, artificial intelligence based on large training sets (which training sets need not be included in memory of the sensor), and additional sensing capability. For example, performance of the event statistical classifier can be augmented by implementing one or more additional sensors to resolve such ambiguities. The additional sensors can include a second microphone (for example to take advantage of binaural detection) or a variety of different types of sensors (in addition to one or more microphones). For example, because showers typically produce steam and increase the temperature of the bathroom and because a sink faucet will typically not generate significant steam and heat to the room, an onboard temperature and/or humidity sensor can disambiguate the inference.

Other examples of sensors that can be useful for augmenting event detection can include Forward-looking infrared (FLIR). FLIR can produce an image from a lens, where each pixel in the image can have an intensity proportional to the temperature of the point on the object in the line-of-sight with that pixel. FLIR can be used to assist in detecting, for example, the presence of people in an environment and/or a stove which has been powered on and left unattended. A barometer, for example, can be implemented to detect a sudden difference in air pressure which can be indicative of air movement caused by a door opening or closing. A barometer can also be utilized to detect the onset of inclement weather, which when such an embedded sensor is implemented as part of a security system or home monitoring system, can be utilized to provide an indication whether windows are open and should be closed.

The rules engine can include a basic set of rules, logic, and/or math which can make the final determination of what events corresponding to the processed sensor data are worthy of having their occurrence being noted and/or recorded in a service. The rules engine can include software and/or firmware which takes as input a vector of probabilities from the event statistical classifier and any additional data coming from other sensors. The rules engine can apply logic and/or mathematical operations to the data to improve the accuracy in various manners. For example, the event statistical classifier's event detection accuracy can be improved as discussed above by disambiguating based on data from additional sensors. Further, accuracy of the ultimate reporting of the event to a service can be improved by taking into consideration known constraints. Certain times of day and/or seasonality can increase or decrease the probability of various events occurring, and inferences can be weighted against events that are less likely. Reporting can also be disabled for lower accuracy determinations or for user-configured privacy reasons.

An embedded sensor system can be in communication with a service, such as a cloud-based service. A web or mobile application and cloud-based management system can provides a user interface for accessing reports of events detected. The service can store reports of events detected and can serve up data to users as desired (for example through dashboard, notifications, etc.). An advantage of various embodiments is that, unlike prior products, raw data detected by the sensors (microphone, FUR, humidity, temperature, pressure, etc) need never be transmitted to the cloud. Accordingly, the data (which can include conversations and other intimate sounds) need never leave the user's local area. For example, such streaming transmission of such raw data can be disabled or such capability can be omitted altogether. Nevertheless, aspects contemplate transmission of raw data in some system configurations and methods, for example to increase the size training sets. This can allow embedded sensors to become even more accurate in recognizing events in their particular location. For example, acoustics of a particular location can alter sound vectors, and so training a specific sensor to a particular location can be advantageous. But in ordinary operation, the preferred embodiments would not be readily capable of transmitting raw data, at least not without the user's authorization, such as through a physical toggle that can switch between a configuration that allows raw data transfer and a configuration that does not. Rather than transport private and/or personally identifiable information to the cloud, only a record representing the occurrence of an event can be transported to the cloud. This can protect the privacy of users. For example, if the rules engine receives probabilities from the event statistical classifier and alternative sensor data and determines that a shower took place at a certain time. As an example, an occurrence report transmitted by a rules engine to the serve can take the form as follows: "bathroom 1, shower, 2019/01/23, 08:23:01," which includes the location, event, date, and time.

Figure 2:
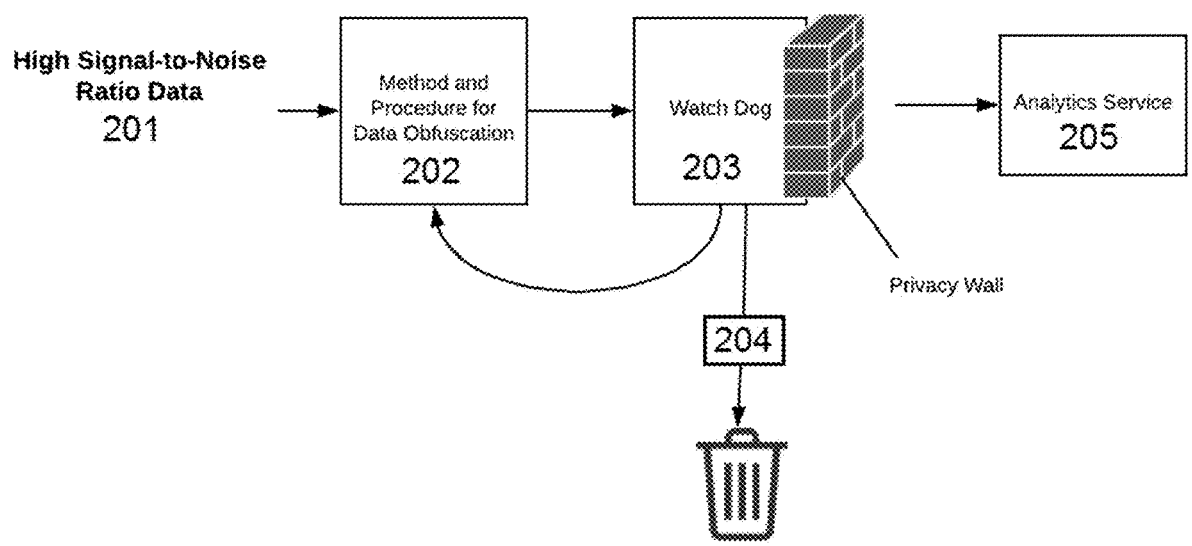
FIG. 2 illustrates an exemplary method of various embodiments for monitoring environments.

FIG. 2 illustrates an exemplary method of various embodiments. A monitoring device can be deployed to the environment in which monitoring is desired to take place. Data with a high signal-to-noise ratio (SNR) can be collected from various sensors (201). The SNR is a measurement comparing the intensity of desired information in the data with the intensity of undesired information in the data. A large signal-to-noise ratio can indicate that the desired information is reliably present in the data and a small signal-to-noise ratio can indicate an inability to distinguish desired information in the data. For example, if the sensor has only a video camera, and the desired information is the number of people present in the image, then there is a range of image resolution below which the number of people in the image cannot be reliably ascertained. Above that range, however, the determination of the number of people becomes increasingly higher as a function of SNR to the point of certainty. The collected data, which can be detected by microphones, cameras, FLIR, etc., can include potentially high-value private information. The detected data can be obfuscated (202). The data can be obfuscated using SNR reduction tools with the desired outcome of decreasing the data's SNR. A watch dog (203) can be employed to ensure that all potentially private data is retained behind a privacy wall, and a determination can be made whether to store the data or to delete the data (204). The watch dog can examine the obfuscated data to determine the SNR. If the SNR is below a user-defined privacy threshold, then the watch dog transmits the data to an analytics service, which can extract further utility from the data. If the data is above a privacy threshold, the watch dog can send the data back for further obfuscation (202) in an iterative process. Clean reports can be sent to a service (205) for further analysis and/or logging.

Figure 3:
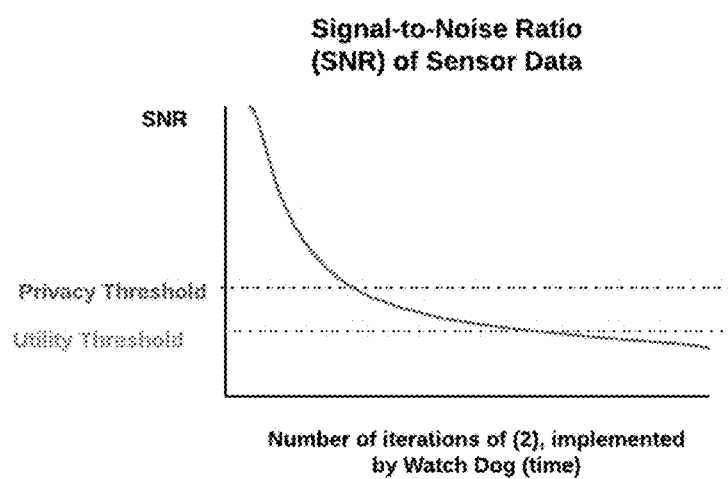
FIG. 3 illustrates a graph of signal-to-noise ratio (SNR) as a function of iterations implemented by an exemplary watch dog of various embodiments.

FIG. 3 illustrates a graph of the signal-to-noise ratio (SNR) as a function of iterations implemented by the watch dog. The x-axis represents the number of times that the watch dog forces iterations, with the desired outcome that the SNR decreases with each iteration.

Figure 5:
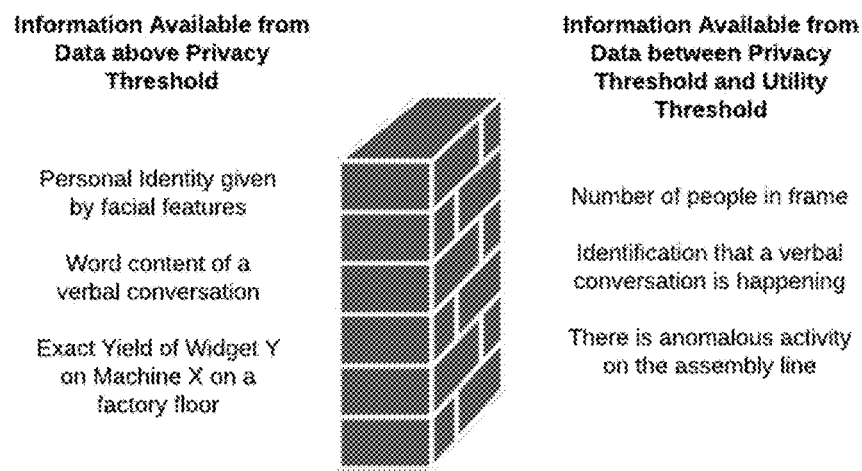
FIG. 5 depicts examples information present in signal data before and after an exemplary watch dog process.

Methods can be optimized to account for constraints in processing real-time data. For example, the watch dog can keep count of the total number of iterations, and if after a certain number of iterations the SNR is still above the privacy threshold, the watch dog can dispose of the data. Disposal of data, rather than risking transmission of private information, can further ensure privacy by the systems and methods. Although privacy is guaranteed, utility of the data after (3) is not guaranteed. FIG. 5 depicts examples information present in the signal data before (left) and after (right) the watch dog process. Guaranteeing privacy can mean that the information in the left column can no longer be extracted from the transmitted data; the information in the right column, however, may or not may not be present at all times after the watch dog process.

The embedded sensor can include an integrated circuit and various types of sensors that can collect data from the environment in which the sensor is placed. Some examples of sensors which can be utilized are: microphones, video cameras, infrared, ultraviolet, pressure, vibration, temperature, forward-looking infrared (FLIR), etc. Combining data analysis from all of the sensors can result in a set of data having a large signal-to-noise ratio, meaning that the desired information can be extracted from the data.

Figure 4:
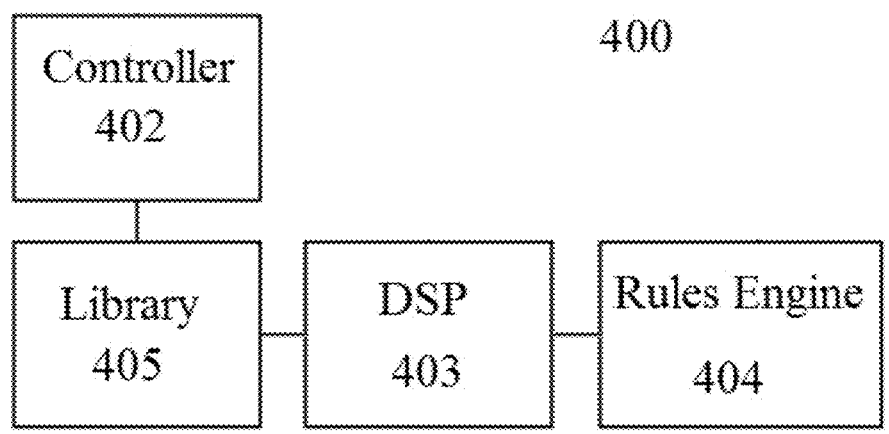
FIG. 4 illustrates an exemplary embedded sensor.

FIG. 4 illustrates an embodiment of an embedded sensor (400). The sensor can include a controller (402), a library (405), a DSP (403), and a rules engine (404). Similar to the embodiment of FIG. 1, embedded sensor (400) can be in communication with a service. The DSP (403) can be configured to perform environment classification as well as statistical classification. An advantage to this embodiment is lower manufacturing costs, due to having only one DSP. But costs can be further reduced due to lesser memory requirements, e.g. smaller RAM. Less memory is required by this architecture because only one type of classifier operation occurs at any given time, reducing the total amount of temporary memory needed for the sensor to allocate to computing processes. The audio digital signal processor can be preloaded with statistical classifiers which have been engineered to associate the streaming data with the environment in which the sensor is located. The environment classifier can inform the controller when an event associated with a particular environment is successfully identified. The controller can assign an appropriate statistical classifier to the DSP. The DSP can send output probabilities to the rules engine based on audio data fed as input to the statistical classifier. Optionally, the rules engine can receive data from other sensors to help increase the accuracy of inferred events. The rules engine (404) can have a separate model for reviewing output of the audio DPS and/or the other optional sensors. When the rules engine makes a determination, the results can be sent to the service for action (update mobile app, dashboard, dial 911, etc.). No audio, video or personally identifiable information need ever be sent from the system to the service (only a notice of events identified).

It should be noted that the embodiment of FIG. 4 is not intended to be a downgraded version of the embodiment of FIG. 1; they are simply different. For example, the CPU, the DSP, and the memory utilized in the embodiment of FIG. 4 can all be maximized. Further, environment and event classification can be performed simultaneously or nearly in parallel because each sound can be analyzed for both environment and event types. To further ease onboard requirements, embodiments can increase connectivity to a service, therefrom obtaining downloads of different and/or updated libraries.

Various configurations can include a memory stack. There are several advantages to allocating a portion of a memory stack for recorded raw data. A stack is tightly controlled, and the size of the portion allocated to recorded raw data can be limited by design. Accordingly, a stack can be utilized for temporary storage of raw sound data, and as additional sounds are detected, the additional raw data can be sent to the dedicated portion of the stack, thereby overwriting the previously captured raw data. This can result in any storage of raw data being nearly transitory and extremely limited in length of recorded time. Stack operations are also relatively fast, meaning that reading and writing to the allocated memory need not slow down processing of audible events. Embodiments contemplate DSPs that can include direct memory access (DMA) to allow access to main system memory. As one example, DSPs can implemented as hardware accelerators including DMA. Other embodiments, however, can have DSPs with their own dedicated memory chips to further improve overall detection to recognition processing time.

While in general usage, it is preferred that significant amounts of raw data not be stored on a long-term basis, there are some exceptions. For example, embodiments can be useful in allowing the elderly to live independently longer because events such as taking medicine, cooking, washing, and falling can be detected, recognized, and ultimately monitored. While those first three events can be repeatedly performed and the raw data analyzed during training of a sensor system, asking grandma to take several falls around her home in order to detect and analyze the sound vectors is not feasible. For rarer events that are not feasibly reproducible, it can be advantageous to retain the raw data for the captured sounds. A portion of memory can be allocated for unrecognized sounds meeting certain thresholds. Then if it is later determined that such raw data should be analyzed, the black-box-type memory can be accessed and analyzed.

Some embodiments can include an application-specific integrated circuit (ASIC) and/or a system-on-chip (SoC) implemented, for example, within ARM Advanced Microcontroller Bus Architecture. Such embodiments can include multi-processor designs with large numbers of controllers and peripherals operating via bus architecture. Such architecture can provide a designer the freedom to utilize a host processor (such as a CPU) in conjunction with ASICs and/or SoCs, or to simply use ASICs and/or SoCs without a CPU. An advantage to the architecture is that memory and other operations can be implemented via Advanced Extensible Interface (AXI) and/or Coherent Hub Interface (CHI). An AXI bus can provide higher performance interconnects, and CHI has a high-speed transport layer and features designed to reduce congestion.

The statistical classifier library and the controller logic can be updated remotely by a service. This has several advantages, including the ability maintain and update sensor systems after deployment. This can be important where embedded sensors are intended to remain in place for several years. For example, a particular model of microwave in one location of a kitchen can produce a different sound vector than another model of microwave in a different location. This can lead to the environmental classifier at the time of installation detecting the former environmental location/configuration and loading the appropriate classifier library. When the user later replaces the first microwave, the statistical classifier might not as accurately detect the new configuration of the environment. A periodic or remotely forced analysis of the environment by the environmental classifier can address the new environmental configuration by downloading a new appropriate statistical classifier library. Updates to the statistical classifier library and/or the controller logic can also be initiated where, for example, the sensor determines that it has detected a certain number of unrecognized sounds within a certain amount of time. A cloud-based software platform can also manage more mundane functions such as firmware updates.

Examples of remote control can include updates to the statistical classifier library and/or parameters of the rules engine. Various situations can warrant a reset of the device to an environment detection mode. For example, anomalies or discrepancies, e.g. odd detection patterns or discrepancies in the data hosted by the service, can be indicative of failure. In the event that no anomalies or unacceptable discrepancies are detected by the service in the reports received and no user requests for intervention have been received, then the management system can push an update to the controller to ensure that the environment statistical classifier is no longer processing audio data, and therefore that it is no longer sending data to the controller. Such updates can also ensure that the controller is no longer expecting data to come from the environment statistical classifier. In another situation, a user can request intervention, for example where a device is moved from one environment to another and/or where a device is moved from one location in the environment to another location within that environment. In some embodiments, the procedure of identifying the environment occurs only on a factory reset of the sensor, implemented for example by a button on an integrated circuit board or by an instruction sent by a management system to the sensor.

Logic can be applied to the controller so that the system is not constantly toggling new models to the active audio DSP. This can help achieve energy savings. The logic from a recent update pushed to a controller can be enforced, meaning that the controller is no longer accepting data from the environment statistical classifier and that the environment statistical classifier is no longer taking input data and processing it. Where the environment in which the sensor is located has been successfully identified, there is generally no need to spend computing resources on attempting to infer the environment's identity. The controller can effectively accept that the event statistical classifier which has been loaded is in fact correct, and the controller need not attempt to effectuate further changes. For example, if the sensor is part of a wearable device (e.g. a smartwatch), then a priority can be preserving battery life, while still performing the necessary functions, and power can be conserved by not toggling between statistical classifiers when not necessary.

Embodiments can take various forms to achieve certain functionality and can be configured to solve certain problems. For example, an embedded environment classifier can be utilized as part of an elder care solution. In particular, embodiments can provide reports for caregivers about the health and wellbeing of people receiving care by providing access to event reports, and without direct monitoring of any video or audio (preserving privacy). Caregivers can take the form of adult children providing care to aging parents, but some other examples are parents caring for adult children with disabilities and clinics monitoring the wellbeing of patients. In such embodiments, an environment classifier can classify the type of room in which the sensor is deployed, from a set of rooms in which the subject being monitored can be expected to use, e.g. bathroom, kitchen, living room, etc. The sensor can monitor for events such as eating times, washing, taking medicine, sleeping, bathing, accidents, etc.

As another example, the subject of interest can be machinery. Embodiments can be advantageously deployed for equipment monitoring, for example to identify malfunctions and/or out of the ordinary operation. This can facilitate the early identification of problems and faster reaction times after catastrophe. In the following examples, the event classifier can identify anomalous and non-anomalous events.

Mechanical Anomaly Detection—The sensor can provide reports for the owner of mechanical equipment about possible malfunction of the equipment, or indicators of imminent malfunction. The report can allow the owner to make better estimates on the longevity of assets, as well as improve safety. For example, if the sensor is deployed in close proximity to the engine of a motor vehicle, an acoustic environment of an engine used primarily to drive a vehicle in a city environment (30 mph or under) would be very different from that of an engine which is used to primarily drive a vehicle in a highway environment (60+mph). Statistical classifiers can be specifically optimized for each of those environments. An event classifier can distinguishes between various anomalous and non-anomalous activities, such as the sounds made by the vehicle's fan blades on the engine, which may spin at abnormal frequencies. The event classifier can identify the audible difference that is caused by the abnormal spinning of the fan blades. Another example is the monitoring of cabinets which contain server-blade-like components. Each cabinet can have blades from a variety of vendors, with each blade performing a variety of functions depending on time of day or seasonality. That creates a challenge to identify what, for example, the sound profile of a "high traffic" or "low traffic" cabinet is in a way that scales to the dynamic needs of such an array.

Embedded sensors can be deployed on factory floor for anomaly detection. This can be advantageous for ensuring, for example, that yield goals are met and machinery is operating safely. For example, two cameras can be assigned to a machine, which has the task of attaching a component to a widget, to count the number of widgets going in and going out. One camera can be placed at each end of the machine, one for input and one for output. Because there is a count of the widgets going in and a count of the widgets coming out, any discrepancy between these two counts can trigger a positive detection of an anomaly indicative of the machine performing improperly. Further, while the sensor can capture detailed images of the widget, the system can be configured so that only information about the counts and any discrepancies are report (and no images need be transmitted).

A weight sensor can measure weight at various places under a machine. Detected fluctuations in weight (such as from the tumbling of a loose part inside the machine) can indicate a malfunction, or can be combined with the detected audio vector to further confirm that a malfunction has occurred or is imminent. The exact yield of the machine may be present in weight measurements, because the weight sensor may be positioned at certain locations over which all widgets must travel as they pass through the machine. At such locations, there will be a particular periodic weight differential observed which corresponds to the regular flow of widgets passing through the machine. The yield of a machine is desired to be kept private because a competitor can use this information to project an expected total units manufactured, and update their market strategy accordingly.

City Anomaly Detection—Governmental agencies can advantageously deploy the remotes sensors to obtain reports of for locations about town. For example, sensors can be deployed, and pedestrian and/or traffic patterns can be identified by anomalous audio activity on a sequence of city blocks. This can indicate opportunities for optimizing algorithms that control light signals, a change in police surveillance locations, a change to tourism efforts, etc. The sensors can also be configured detect anomalies like gunshots, explosions, screams, etc., which use a service to contact emergency services. In the traffic example, the sensors can identify the environment determined by its traffic types and corresponding volume. Different combinations of pedestrian and car traffic can result in very different acoustic environments. In that example, it can be advantageous to have a distinct environment for each level of low/medium/high amounts of pedestrian and/or car traffic.

Various means can be employed for constructing statistical classifiers. One example for constructing a statistical classifier can include compiling a collection of samples that can be labelled according to the class of which they are a member. The classification task can include identifying events in the home, such as toilet flushing, kitchen faucet running, microwaving, etc. In this case, many measurements of each event can be captured at various times, from various locations, and with varying other background sounds. The several captured audio clips can be processed into audio vectors. It has been found that event recognition accuracy can be improved by capturing a greater number of audio clips for a type of event under many different conditions. For example, capturing audio clips of a faucet running in several different environments (homes, offices, gyms etc.) under several different circumstances (with a television on, with a radio on, with live conversation nearby, with footsteps on a hardwood floor, etc.) can improve the overall accuracy in recognizing a faucet running in any specific environment. While there are points of diminishing returns, accuracy typically improves in correlation with the number of differing audio clips for a given event in a training set.

By way of example, a library of approximately 1500 samples of an event was curated from various homes and locations. The event was captured under a variety of conditions, such as varying distance from a microphone, different room configurations, and with different background sounds. Houses were primarily used simply out of convenience, but the diversity of overlapping sounds (e.g. footsteps, human speech, pet noises, etc.) within households is relatively high compared to offices and industrial locations, allowing for a relatively diverse training audio library. The diversity of background and acoustic differences can be problematic and require greater numbers of samples. To overcome this, an audio library can be augmented in a process referred to herein as diversification. Diversification can involve generating additional audio samples by way of synthetically combining pre-existing audio examples with publicly available everyday audio examples (such as white noise, footsteps, human speech, etc.). A straightforward programming script can be utilized to combine the training set with the audio examples to achieve a superset of audio samples. With the larger, diverse library of examples, an event statistical classifier was construction with the ability to take an audio clip as input and return an inferred label as output. Choosing a type of statistical classifier (e.g. neural network, multinomial logistic regression, random forest, etc) to implement corresponds with a particular choice of loss/cost function and an optimization method for minimizing the cost function. Once a choice is made, the library can be divided by randomly assigning examples to either a training set or a test set. Although somewhat arbitrary, 75% of the data was used for the training set and 25% of the set was used for the detection set. The training set samples (both the data and respective labels) were fed into an analyzer that minimized the cost function's value on the samples through the use of optimization. Next, the test set examples were taken as input and the inferred labels were given as output. High accuracy in the inferred labels was achieved based on the approximately 1125 samples in the training set. It is important to note that this example was not driven by the number of samples required to achieve acceptable accuracy. Far fewer samples are typically required. For example, distinctive sounds can be acceptably detected with less than 100 samples in the training set, and other methodologies described herein can be utilized to achieve acceptable accuracy with far fewer audio samples.

The same audio library files can be used to construct an environment classifier. For environment identification, it can be advantageous to first identify a single most distinct event from each environment of interest. In a home, for example, two of the most distinctive audio events are a toilet flushing and a microwave beeping, the former obviously being associated with a bathroom and the latter with a kitchen.

Various comparison and identification algorithms can be utilized by the rules engine and/or DSP to infer an event based on the library/logic. For example, a direct comparison of known vectors to an event can be performed. While development costs are likely lower to implement, this inartful technique is somewhat computationally intensive, and other (or at least additional) techniques can be implemented for greater accuracy and lower processing requirements. For example, a fractal AI library can be trained and implemented in various embodiments to achieve both low computational and low memory requirements in the remote sensor.

Figure 6:
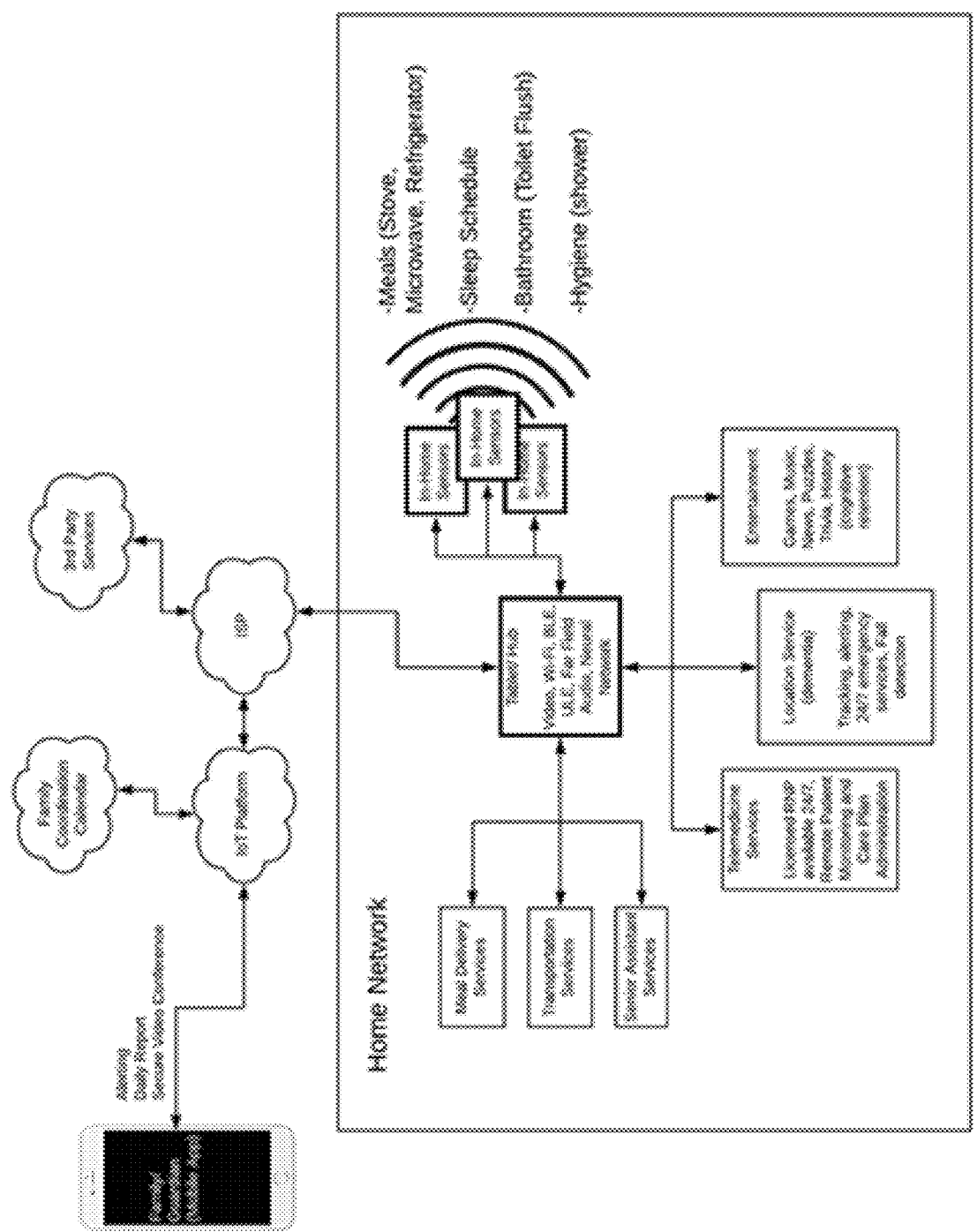
FIG. 6 illustrates an embodiment of a whole-home system.

FIG. 6 illustrates an embodiment of a whole-home system. The system can include a central hub for communicating with and/or coordinating other elements of the system, such as services and sensors. As shown, the system can include or can be part of a neural network with services and can be in communication with an Internet of Things (IoT) automation platform via an ISP. The whole-home system can provide alerts to remote devices, such as a mobile device, through an app, of a caregiver or loved one. The whole-home embodiment can address meal delivery (considers dietary restrictions), entertainment (depression/cognitive retention), telehealth services (which can include RPM Care Plans and Teledoc), transportation services, alerting for fall detection, location detection, regular reporting to caregivers (meals, sleep habits, health stats, entertainment durations/mobility tracking, etc.). The system can be configured to provide video and voice communications (which can be further facilitated by location awareness of the system), coordination of activity with family members (support network), helper services (visiting background checked helping services), etc. The system can include a plurality of embedded sensors. An example of two embedded sensors (one a camera and the other an audio-based sensor) can be seen in FIG. 11.

Figure 7:
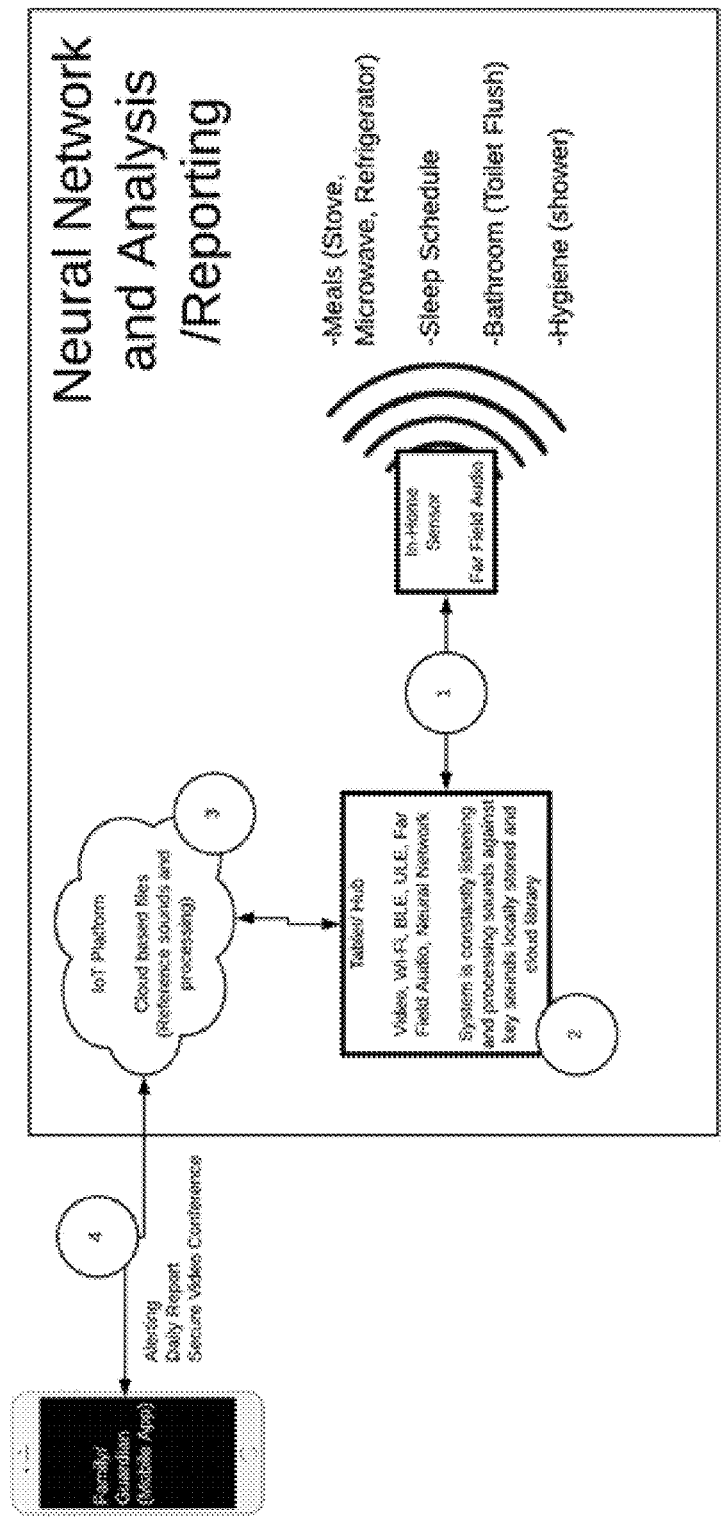
FIG. 7 illustrates an embodiment including a neural network for analysis and reporting.

FIG. 7 illustrates a neural network for analysis and reporting. The embodiment can include in situ audio sensors. The system can use a neural network sensor to parse audio vectors associated with detected activity and can translate that analysis into actionable data, for example to caregivers. An embedded sensor can be utilized to detect specific sounds and to translate that data into reports that can be used to manage the care for seniors who are aging in place. An advantage to the embodiment is that it can omit video capture, which inherently includes private information. Aspects can include listening and capturing key sounds indicative of activities, processing sounds to determine sound matches, and additional processing and/or analysis, if needed. Logs for the subject, and even the subject's patient record, can be updated with activity reports. Reports can be communicated to family and/or guardians via a secure mobile application.

Figure 8:
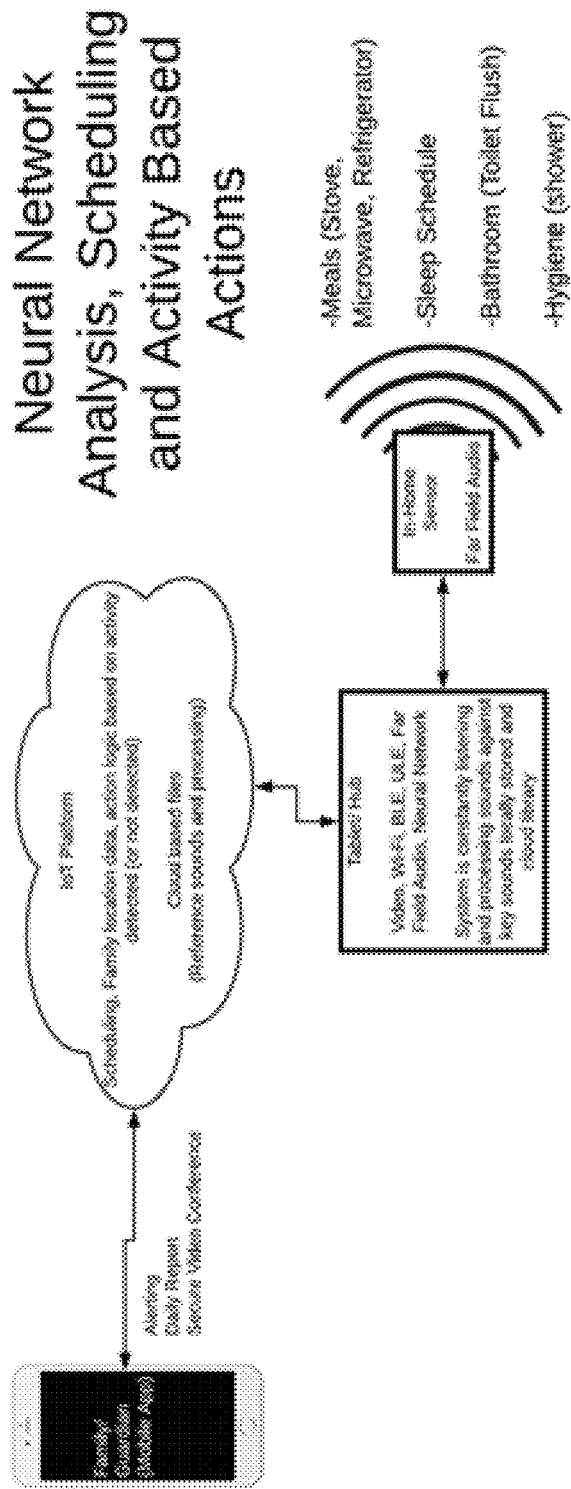
FIG. 8 illustrates a neural network embodiment for analysis, scheduling, and activity based actions.

FIG. 8 illustrates a neural network embodiment for analysis, scheduling, and activity based actions. The system can be designed for managing independence for seniors via cloud-based reminders (scheduling for appointments, medicine, coverage of caregivers, family members). The system can provide a secure invitation process for authorized system access for patients, etc. Patient care and activities can be coordinated with a cloud-based calendar. Access to the calendar and for interacting with the patient can be managed via a secure invitation process. As discussed above, system need not rely on trigger words to take action. There can be several components to the actions taken. For example, the system can be programmed with key events (such as appointments, medicine schedules, etc.). The system can issue reminders to a primary guardian and/or the patient about key events. Based on a reminder to a guardian, the guardian can make a video call to the patient. The system can issue reminders based on the subject's activities. For example, if the subject has not bathed or eaten for a certain period, a reminder can be issued periodically to the subject until the system detects the subject has performed the delayed task. Further, if the subject does not take the appropriate action for another certain amount of time, the guardian can be notified.

Various other functionalities can be programmed into the system to provide cues and/or aids for independent life. For example, the system can detect that the subject prepared and had a meal but that dishes were not cleaned, and the system can prompt the subject to see whether the subject would like help doing the dishes. The system can be programed to provide alerts and/or reminders about birthdays, anniversaries, and other special occasions. The system can ask the patient if they would like to call the person related to the event. The system can also account for the calendars of caregivers, guardians, and/or family members registered with a service, for example to allow calling when they are available, and vice versa, i.e. a guardian/child can be alerted when the subject has returned home, allowing video communication to be initiated when all parties are available. The system can also provide alerts based on safety notifications, such as for significant weather events. The subject can be notified via a tablet, a hub, and/or a wearable device. The guardians can also be notified to ascertain whether the subject is taking appropriate actions.

Figure 9:
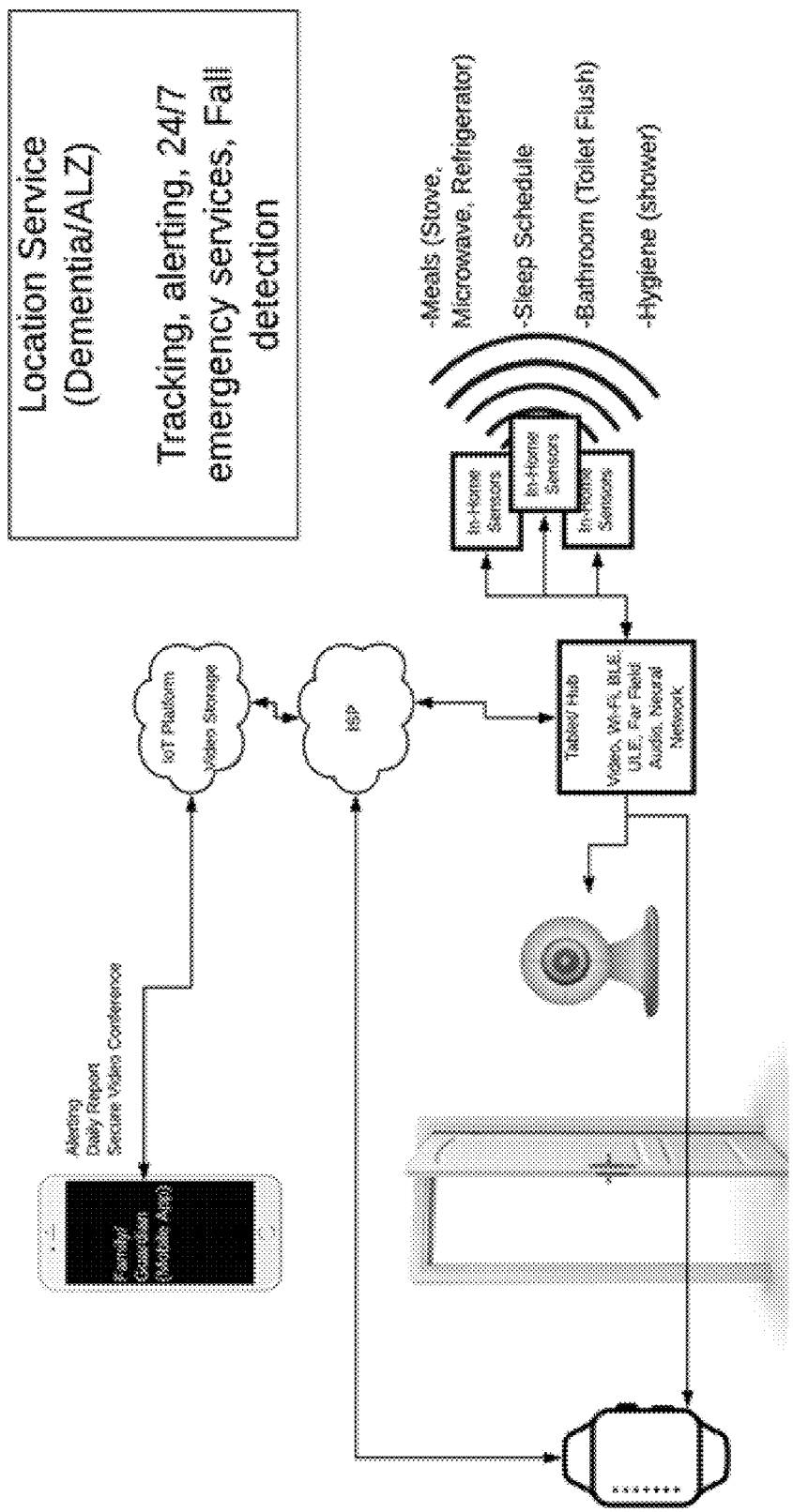
FIG. 9 illustrates a comprehensive tracking, alerting, and monitoring embodiment having location services.

FIG. 9 illustrates a comprehensive tracking, alerting, and monitoring system having location services. The embodiment can be particularly useful for patients with dementia such as Alzheimer's. The system can include a wearable. The wearable can include fall detection, Bluetooth Low Energy (BLE), WiFi, support for voice services, emergency calling, and/or GPS or augmented GPS. The wearable can track the subject's activity when outside of the home, such as via GPS, and can upload location to an IoT platform, such as via a cellular connection. Such uploaded data can include location, number of steps for a given time period, places visited, etc. Cellular can be disabled when in range of a WiFi and/or Bluetooth connection to conserve battery life. Cellular can also be disabled until needed, such as upon detection of a fall, a request by a monitoring user (such as in the event of the subject's location being unknown), and/or upon other user-defined events.

Figure 11:
FIG. 11 illustrates an example of two embedded sensors.

The system can include motion sensors at exterior doors of the home. If motion is detected but a BLE signal of the wearable is not detected, the subject can be notified to put on the wearable before leaving the home. Some embodiments can include cameras, such as IP cameras that can capture still images and/or several-second clips of anyone approaching an exterior door, and can be aimed toward or away from the door as well as be located inside or outside the home. An example of the camera at a front door, pointing inwardly, is shown in FIG. 11. In the event the system detects someone exiting the home without the wearable, a guardian can be alerted via a push notification of an app, and a video/still image can be made available via the same app. The system can detect when the wearable's battery is low, and the subject and/or guardian can be alerted, such as through a reminder to charge the device and/or a push notification with current location. Push notifications with location data can be sent at predefined battery levels, such as at 15%, 10%, 5%, and as part of the dead-battery shutdown procedures of the wearable. This can allow the guardian to have several points of reference regarding location, movement, rate of travel, and finally a last-known location.

By using a combination of neural network, sound detection and recognition, video, GPS, and BLE the comprehensive system can track the subject inside and outside of the home around the clock. The video camera can be separate from the tablet/hub video capabilities.

FIG. 10 illustrates an exemplary report to a guardian (in this case a subject's child). The report can be sent daily, weekly, or according to the guardian's preference, and can be sent to an app on the guardian's phone and/or computer. The report can include health information, physical activity, hygiene information, and various other information, such as number of meals, entertainment time, and/or sleep/wake schedules. Some embodiments can leverage a mixture of sensors inside and outside of the home to provide the caregivers/guardians/kids a 360-degree view of the subject's day. Embodiments can provide answers to important questions, such as whether the subject is home, safe, healthy, eating, showering, getting enough sleep, bored and alone or entertained.

As discussed above, detected data can be obfuscated to help ensure privacy. But the discussion above primarily focuses on data processing at the edge of detection. Alternatively, or additionally, some embodiments contemplate obfuscating detected data for transmission to and processing by cloud-based or other removed services. This can be facilitated by an adaptive privacy filter. The data can be obfuscated using SNR reduction tools with the desired outcome of decreasing the data's SNR. The data can be transformed in a way which will remove undesired, private information from the sensor data. For example, software residing in a memory and executed by a digital signal processor can perform the transformation. A DSP is particularly useful for this task because it can have an architecture specialized for processing real-time sensor data. A DSP can receive analog and/or digital signals and convert the signals to vectors and can perform additional linear operations on the vector to measure, filter, and/or compress the received signals. While a DSP is typically distinct from a CPU, a DSP can be implemented in conjunction with or even within a CPU programed by software.

The data from a detector can contain private information that can be irrelevant to the problems being solved by the analytics service. For example, where the detector is only a video camera and the analytics service is only interested in counting the number of people present at the sensor, then an image in which one can clearly see both body outlines and detailed facial features contains more information than is necessary to solve the problem of counting people. Various obfuscation techniques can be implemented to handle the unnecessary portions of the raw detected data in that scenario. For example, to remove the private/unnecessary information present in the data, obfuscation tools can be utilized in a way that does not decrease, or only acceptably decreases, the SNR of the portion of data of interest. For example, some obfuscation tools can include downsampling, bandstop filters, and removal of pixels.

Downsampling can be performed on data coming from a detector within the sensor, such as an audio sensor and/or a video camera. The downsampling can average adjacent pixels (or a pixel range) such that the resulting image can be represented by fewer pixels and thus can have a smaller resolution. Downsampling can allow the resultant images to be incapable of distinguishing specific persons without additional information but still allow the number of persons within the image to be readily discernable.

Bandstop filters can obfuscate data from a microphone, i.e. an audio sensor. For example, bandstop filters can make recorded conversation unintelligible, yet embodiments can still be trained to identify the resulting data as human speech. In other words, it can be determined that two people are talking, but the resulting data would not allow determining that John and Mary are discussing their weekend plans.

Pixels can be removed from video camera data to facilitate obfuscation. For example, where a camera has a fixed aim, certain locations (such as a bathroom and/or bedroom) can be cropped by removing specific pixels. As another example, a system can be programmed to recognize the general dimensions of a person within the captured images and to further remove pixels (or to downsample) around the approximate location of the person's head.

An adaptive privacy filter can implement a statistical obfuscator. A statistical obfuscator can be constructed and optimized to take high SNR sensor data (in vector form) and output data with a lower SNR (in vector form). Mathematical methods can be used to determine the direction in which the SNR of the sensor data is minimized. This can result in a vector which points in the direction of low SNR. Vector addition can be utilized to find a new vector to push the sensor data towards a lower SNR. Optimization can utilize a gradient descent for minimizing the SNR function. The gradient descent can point in the direction of a function's maximum (or minimum, depending). The gradient can be calculated for the SNR function, and a suitably scaled version of that vector can be used to push the data towards a lower SNR. The suitability of the scaled version of the vector can be optimized to ensure that that distortion is not too great. Rescaling can be performed as desired for a given scenario and/or use case to adjust the push larger or smaller.

A watch dog can work closely with an adaptive privacy filter. For example, the watch dog can examine obfuscated data to determine the SNR. In some embodiments, a watch dog in the sensor can include software residing in a memory and executed by a processor, such as a DSP and/or a CPU. The computing chip on which the watch dog runs can be the same component by which the obfuscation task is performed. Watch dog software can take sensor data at a predetermined batch size and can measure SNR for each batch. The watch dog can transmit data to an analytics service for the user to extract utility from the data where the measured SNR is below a predefined privacy threshold.

The privacy threshold can be defined when configuring and/or installing an embedded sensor, or it can be set at the time of manufacture, or it can be set after installation by a remote and/or local update procedure. Several considerations are relevant to the value of a privacy threshold. For example, the value of SNR can be chosen such that sensor data with an SNR less than or equal to the value is believed to not contain private information. Sensor data with an SNR more than this value is believed to contain private information. In addition to measuring the SNR of a batch of sensor data, the watch dog can compare the SNR value with the privacy threshold value. If the privacy threshold value is equal or larger to the measured SNR, then the data is believed to not contain private information, and it will be passed to an analytics service for processing. If the SNR of the data is above the privacy threshold, the watch dog can send the data back for further obfuscation. Due to the nature of real-time signal processing, there are practical considerations that can provide an effective upper bound on the possible number of obfuscation steps which can be applied. As discussed above, once a certain number of obfuscation iterations has occurred without acceptable results, the resulting data can be discarded by the watch dog. The specific maximum number of obfuscation iterations can be optimized based on empirical results, such as processing times and power consumption, during design and/or manufacturing, or can be chosen later, such as by the user. If that maximum number of obfuscation attempts has been reached for a particular batch of data, and the SNR of the batch is still above the privacy threshold, then the data is discarded. In preferred embodiments, a priority of the watch dog is to not compromise private information, but embodiments can be configured to store such batches. Alternatively, depending on overriding concerns, such as safety, a watch dog can be configured to transmit the data after the maximum number of attempts has been reached. In such cases, a special code can be concatenated to the data transmission that indicates to the service that the data contains potentially private information, and the service can be further configured to handle such incoming transmissions differently that other transmissions (such as by segregation into a more secure queue).

An analytics service can perform tasks of interest based on received sensor data that has passed the adaptive privacy filter and/or the watch dog. The analytics service can take various forms. Generally, the closer the service is to the embedded sensor, the higher the manufacturing costs; conversely, the more remote the service, the lower the manufacturing costs. The service can be in a cloud-based platform. Alternatively, or additionally, the analytics service can be implemented through software and hardware within the embedded sensor's local area network. In some embodiments, the analytics service can be implemented within the embedded sensor.

The last example is not necessarily a preferred embodiment (due to manufacturing costs, processing requirements, and power demands). Nevertheless the embodiment can be a particularly useful for industrial, far remote, and hostile locations. In such an embodiment, additional communications functionality can be included as an option board within the embedded sensor, such as cellular, satellite, and hardwired communication interfaces. Such option boards can be implemented in other embodiments as well (for example as discussed above with respect to FIGS. 6-9).

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope or the invention. In addition, from the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

The invention claimed is:

1. An embedded sensor comprising:
an audio detector for detecting a sound associated with an audible event;
a first digital signal processor for receiving signals from the audio detector, wherein the first digital signal processor is configured to compare the signals to a set of environmentally-distinctive sounds and to transmit an environment code based on the comparison of the signals to the set of environmentally-distinctive sounds;
a controller configured to receive the environment code and to identify a statistical model associated with the environment code;
a library for storing the statistical model;
a second digital signal processor for receiving the signals from the audio detector, wherein the second digital signal processor is configured to compare the signals to the statistical model and to determine a probability based on the comparison of the signals to the statistical model;
a rules engine configured to transmit a report of the audible event based on the probability.

2. The embedded sensor of claim 1, further comprising a second detector configured to send detector signals to the first digital signal processor.

3. The embedded sensor of claim 2, wherein the second detector comprises a camera.

4. The embedded sensor of claim 3, wherein the camera is configured to capture infrared.

5. The embedded sensor of claim 2, wherein the second detector comprises a thermometer or a humidity detector.

6. The embedded sensor of claim 2, wherein the second detector is configured to send data to the rules engine, wherein the rules engine is further configured to infer an event based on the probability and on the data.

* * * * *